(12) United States Patent
Albouyeh et al.

(10) Patent No.: US 7,439,956 B1
(45) Date of Patent: Oct. 21, 2008

(54) ERGONOMIC COMPUTER ALIGNMENT

(75) Inventors: Shadi E. Albouyeh, Raleigh, NC (US); Steven M. Kyle, Holly Springs, NC (US); Yen-Kwang Lin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/950,987

(22) Filed: Dec. 5, 2007

(51) Int. Cl.
*G06F 3/02* (2006.01)
*G06F 1/16* (2006.01)

(52) U.S. Cl. .................. 345/168; 361/680; 400/164.3

(58) Field of Classification Search .......... 345/168–171
See application file for complete search history.

(56) References Cited

U.S. PATENT DOCUMENTS

| | | | |
|---|---|---|---|
| 4,925,240 A * | 5/1990 | Peters | 297/161 |
| 5,198,991 A | 3/1993 | Pollitt | |
| 5,229,920 A | 7/1993 | Spaniol et al. | |
| 5,267,127 A | 11/1993 | Pollitt | |
| 5,347,630 A | 9/1994 | Ishizawa et al. | |
| 5,613,786 A | 3/1997 | Howell et al. | |
| 5,659,307 A | 8/1997 | Karidis et al. | |
| 5,706,167 A | 1/1998 | Lee | |
| 5,717,431 A | 2/1998 | Chia-Ying et al. | |
| 5,734,548 A | 3/1998 | Park | |
| 5,818,690 A * | 10/1998 | Spencer | 361/680 |
| 5,821,922 A | 10/1998 | Sellers | |
| 5,951,179 A * | 9/1999 | Zarek | 400/492 |
| 6,061,064 A | 5/2000 | Reichlen | |
| 6,081,207 A | 6/2000 | Batio | |
| 6,233,138 B1 * | 5/2001 | Osgood | 361/681 |
| 6,404,621 B2 | 6/2002 | Zamora et al. | |
| 6,556,435 B1 | 4/2003 | Helot et al. | |
| 6,665,175 B1 | 12/2003 | DeBoer et al. | |
| 6,874,743 B2 | 4/2005 | Watanabe et al. | |
| 2001/0012196 A1 | 8/2001 | Zamora et al. | |
| 2003/0103324 A1 | 6/2003 | Gallivan | |
| 2004/0228077 A1 | 11/2004 | Hall et al. | |
| 2005/0083645 A1 | 4/2005 | Moore et al. | |
| 2006/0125787 A1 * | 6/2006 | Cheng | 345/156 |
| 2006/0164799 A1 | 7/2006 | Varela | |

FOREIGN PATENT DOCUMENTS

| | | |
|---|---|---|
| EP | 1484663 A2 | 12/2004 |
| JP | 10187115 | 7/1998 |

* cited by examiner

*Primary Examiner*—Duc Q Dinh
(74) *Attorney, Agent, or Firm*—Stephen Calogero Dillon & Yudell LLP (57) ABSTRACT

A method, system and computer program product for automatically positioning a computer to an ergonomically correct orientation are presented. An optic sensor at a top of a computer monitor measures a distance and angle to a user's eye. This distance and angle, along with stored anatomical data for a specific user, are used to automatically adjust a base of the computer, thus positioning the computer's keyboard in an ergonomically correct alignment for the specific user.

1 Claim, 11 Drawing Sheets

ERGONOMIC COMPUTER ALIGNMENT

BACKGROUND OF THE INVENTION

The present disclosure relates to the field of computers, and specifically to personal and laptop computers. Still more specifically, the present disclosure relates to physically orienting a computer to an ergonomically correct position.

BRIEF SUMMARY OF THE INVENTION

A method, system and computer program product for automatically positioning a computer to an ergonomically correct orientation are presented. An optic sensor at a top of a computer monitor measures a distance and angle to a user's eye. This distance and angle, along with stored anatomical data for a specific user, are used to automatically adjust a base of the computer, thus positioning the computer's keyboard in an ergonomically correct alignment for the specific user.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java® is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
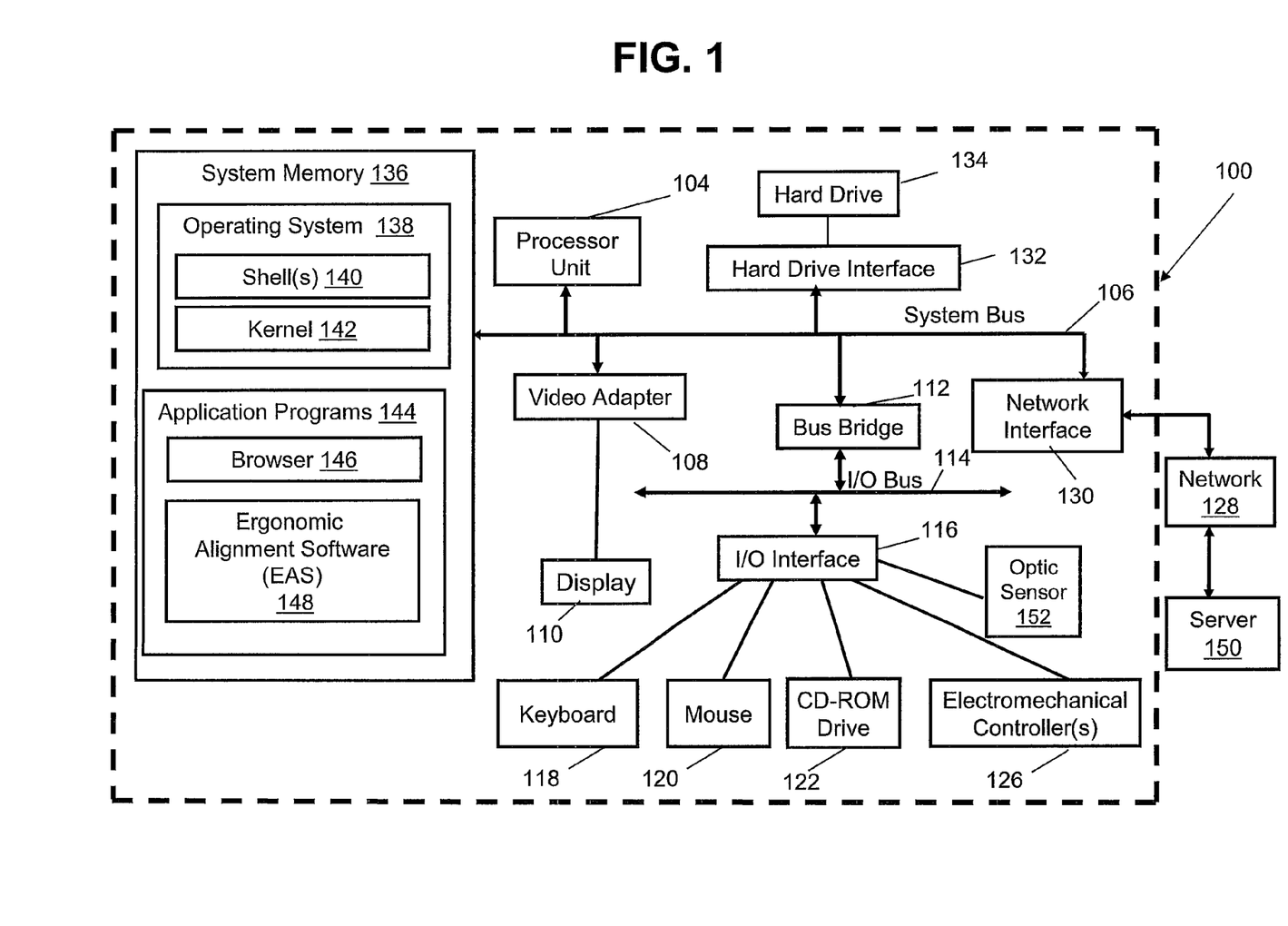
FIG. 1 depicts an exemplary computer in which the present invention may be implemented.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, and a Compact Disk-Read Only Memory (CD-ROM) drive 122. Also coupled to I/O interface 116 are electromechanical controllers 126, which are utilized to mechanically reposition keyboard 118, display 110, and a base enclosure (not depicted in FIG. 1) of computer 100 under the direction of an Ergonomic Alignment Software (EAS) 148. An optic sensor 152 is also coupled to the I/O interface 116. This optic sensor 152, in a manner described in further detail below, is utilized to determine where a user's eyes are in relation to a top of the display 110. That is, the optic sensor 152 is able to measure both the distance from the optic sensor 152 (and thus the top of the display 110) to the user's eyes as well as the vertical angle between the optic sensor 152 and the user's eyes. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include the Ergonomic Alignment Software (EAS) 148, which includes instructions and data (including but not limited to ergonomic data reflecting user preferences and anatomical measurements) required to execute the processes and steps described below in FIGS. 2-11.

In one embodiment, computer 100 is able to download EAS 148 from a remote service provider server 150, preferably in an "on demand" basis. In another embodiment, server 150 is able to execute EAS 148, thus reducing demand on hardware and software resources directly attributed to computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
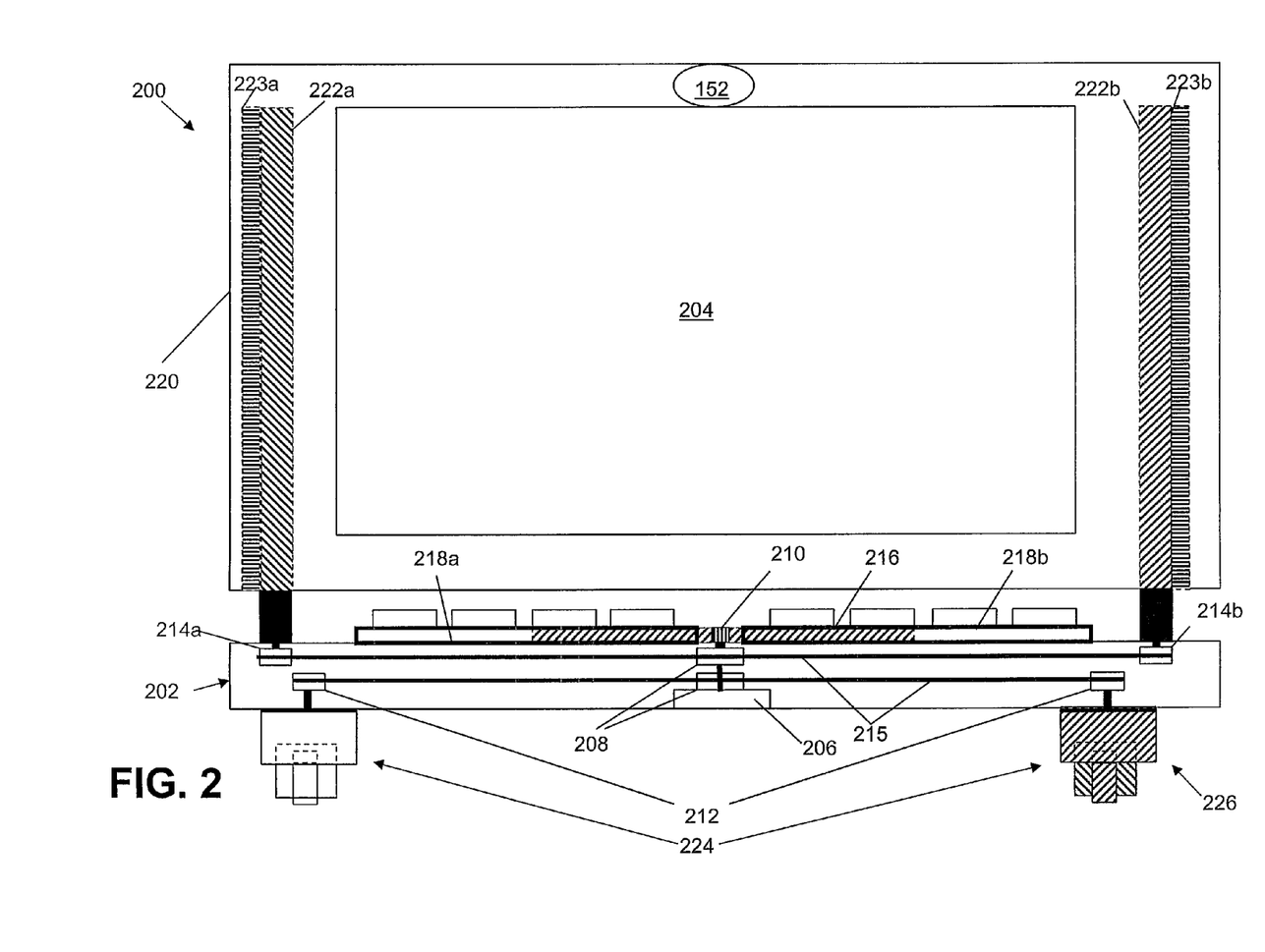
FIG. 2 illustrates a laptop computer that is enabled with electromechanical positioning means in a base enclosure and a screen.

Referring now to FIG. 2, a computer 200, which may utilize the architecture described above in FIG. 1 for computer 100, is presented. Although computer 200 is depicted as a laptop computer, the presently described invention may be utilized in any type of computer, including desktop computers. Computer 200 includes a base enclosure 202 and a monitor 204. Housed within base enclosure 202 are hardware elements required for computer 200 to process software (e.g., processing unit 104, system memory 136, system bus 106, etc. shown in FIG. 1), as well as a motor 206. Motor 206 includes a system of independently driven power pulleys 208 and a drive gear 210. Power pulleys 208 independently provide power to leg pulleys 212 and monitor pulleys 214a-b via belts 215. Power may be supplied from power pulleys 208 to leg pulleys 212 via one or two belts 215. Similarly, power may be supplied from power pulleys 208 to monitor pulleys 214a-b via one or multiple belts 215. That is, each non-power pulley (e.g., monitor pulleys 214a-b, leg pulleys 212) may have its own belt 215, or may share a same belt 215 with another pulley of the same type (e.g., a monitor pulley 214 or a leg pulley 212). Drive gear 210 provides power to keyboard worm gear 216, which is coupled to keyboard plates 218a-b.

Located within (or adjacent to) a monitor housing 220 of monitor 204 (which together make up the display 110 described above in FIG. 1) are monitor worm gears 222a-b, which are engaged with their attendant fixed-toothed strips 223a-b. When power is supplied to monitor pulleys 214a-b, the monitor worm gears 222a rotate at equal speeds to cause the monitor housing 220.

Attached to the bottom of base enclosure 202 are three or more legs 224, which provide a stable horizontal support for base enclosure 202. Each leg 224 is made up of multiple interlocking leg mesh gears 226 that, when rotated by the leg pulleys 212, causes the legs 224 to extend or shorten. Note that in one embodiment, each leg 224 is moved the same distance, such that the base enclosure 202 remains in a substantially horizontal (i.e., not tilted) orientation.

Note that motor 206 is able to independently move each of the multiple power pulleys 208 and the drive gear 210, in order to independently move the monitor housing 220, the legs 224, and the keyboard plates 218a-b. This independent movement is under the control of the EAS 148 software and electromechanical controllers 126 shown in FIG. 1.

Note that the use of gears and pulleys as described in FIG. 1 are only examples of how the monitor housing 220, legs 224 and keyboard plates 218a-b may be electromechanically manipulated. In other embodiments of the present invention, gears, pulleys, hydraulics, rotating arms, cams and/or any other electromechanical means may be utilized to manipulate monitor housing 220, legs 224 and keyboard plates 218a-b.

Monitor housing 220 also contains the optic sensor 152 (also depicted in FIG. 1), whose function is described below.

Figure 3:
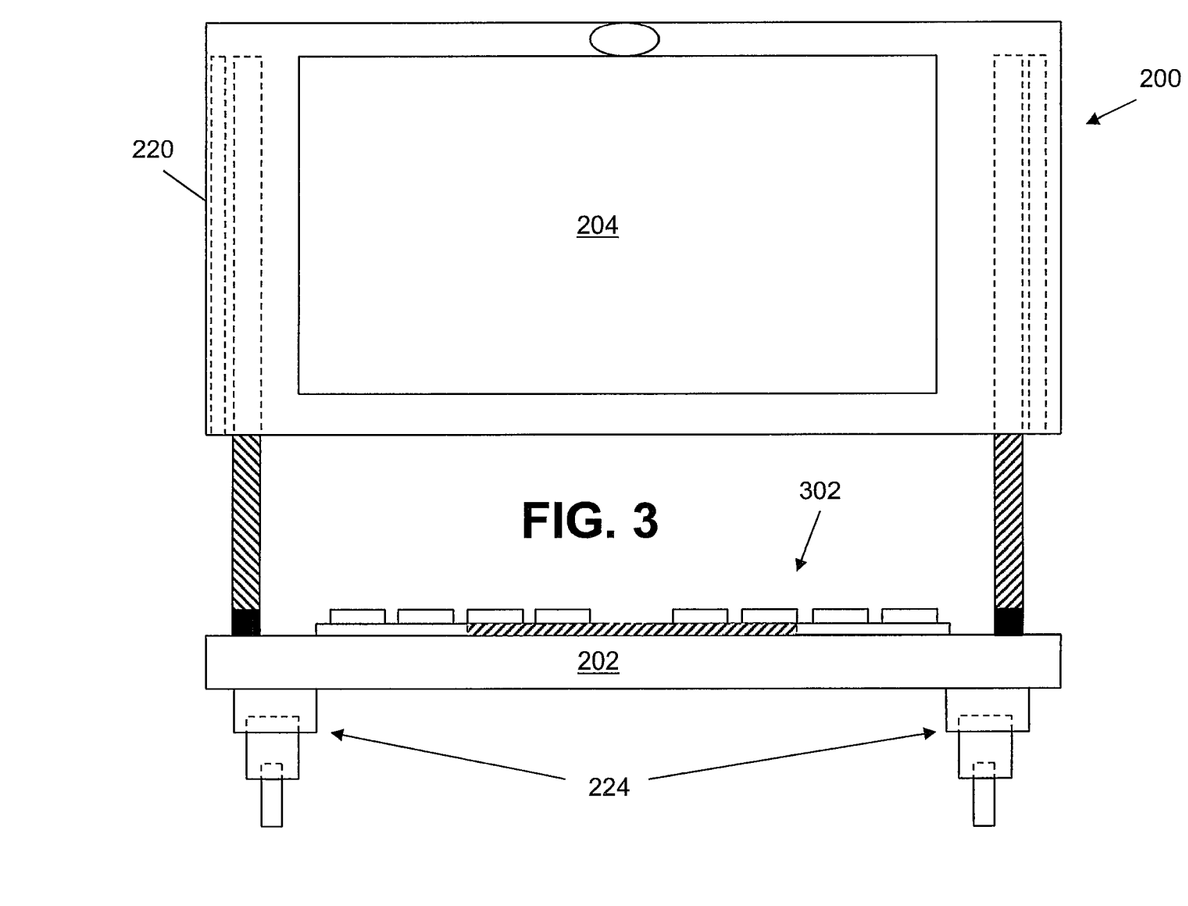
FIG. 3 depicts the laptop computer shown in FIG. 2 in an elevated and extended position.

With reference now to FIG. 3, computer 200 is depicted with the monitor housing 220 raised and the legs 224 extended, thus raising the monitor 204 and elevating the base enclosure 202 (and thus a split keyboard 302 that is coupled to the base enclosure 202). These raising/elevating processes have been performed using the electromechanical means described above (e.g., motor 206, leg pulleys 212, monitor pulleys 214a-b, electromechanical controllers 126, etc.) using optic sensor 152. That is, optic sensor 152 has been used to determine where a user's eyes are (above or below) relative to the optic sensor 152. Using this measured information along with stored user-specific information (e.g., how long the user's torso is) allows the EAS 148 and electromechanical controllers 126 described in FIG. 1 to automatically position the monitor 204 and the split keyboard 302 to a vertical level that is ergonomically correct for the user.

Figure 4:
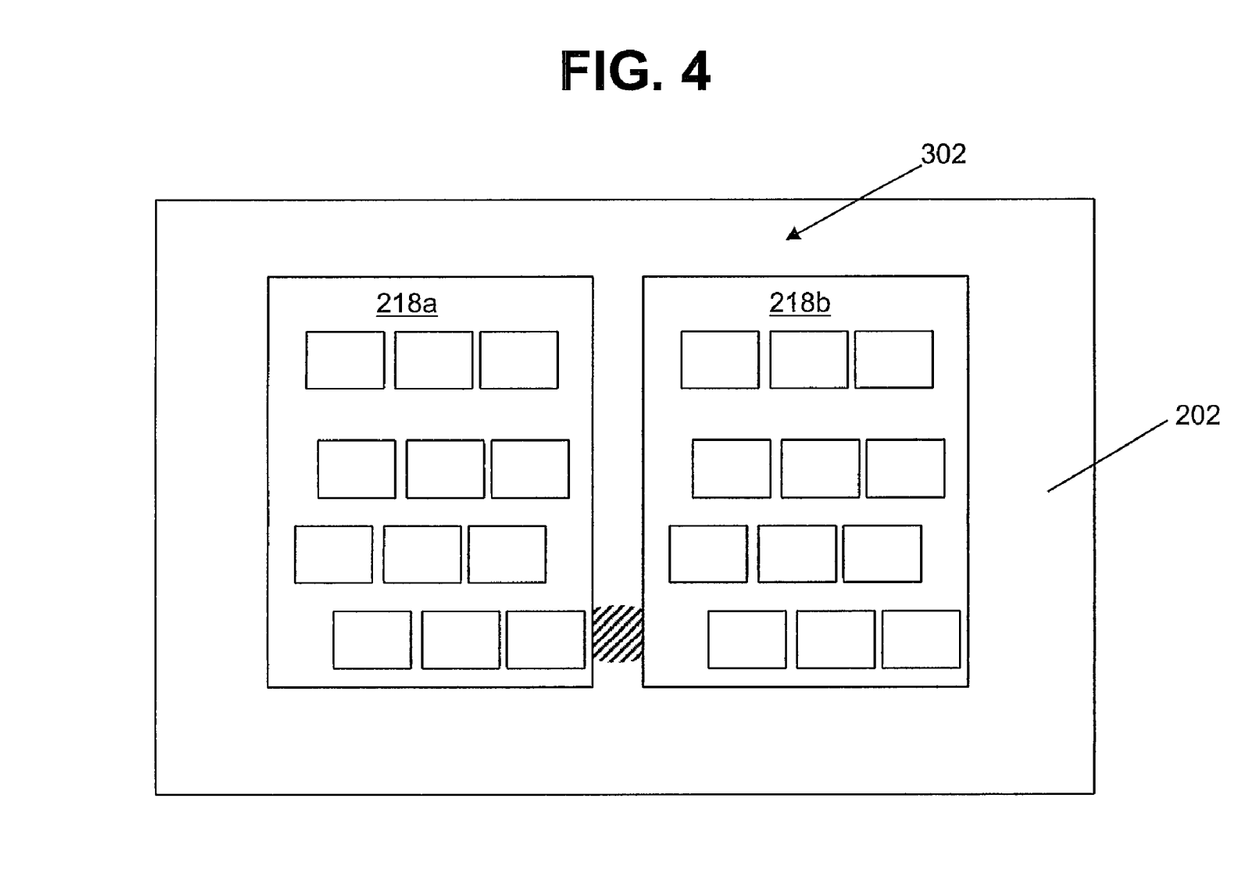
FIG. 4 illustrates additional detail of a split keyboard on the laptop computer shown in FIG. 2.

Referring now to FIG. 4, additional detail is provided for split keyboard 302. As shown in FIG. 2, split keyboard 302 is made up of two halves that are mounted on keyboard plate 218a and keyboard plate 218b. Initially, the two halves of the split keyboard 302 are horizontally aligned.

Figure 5:
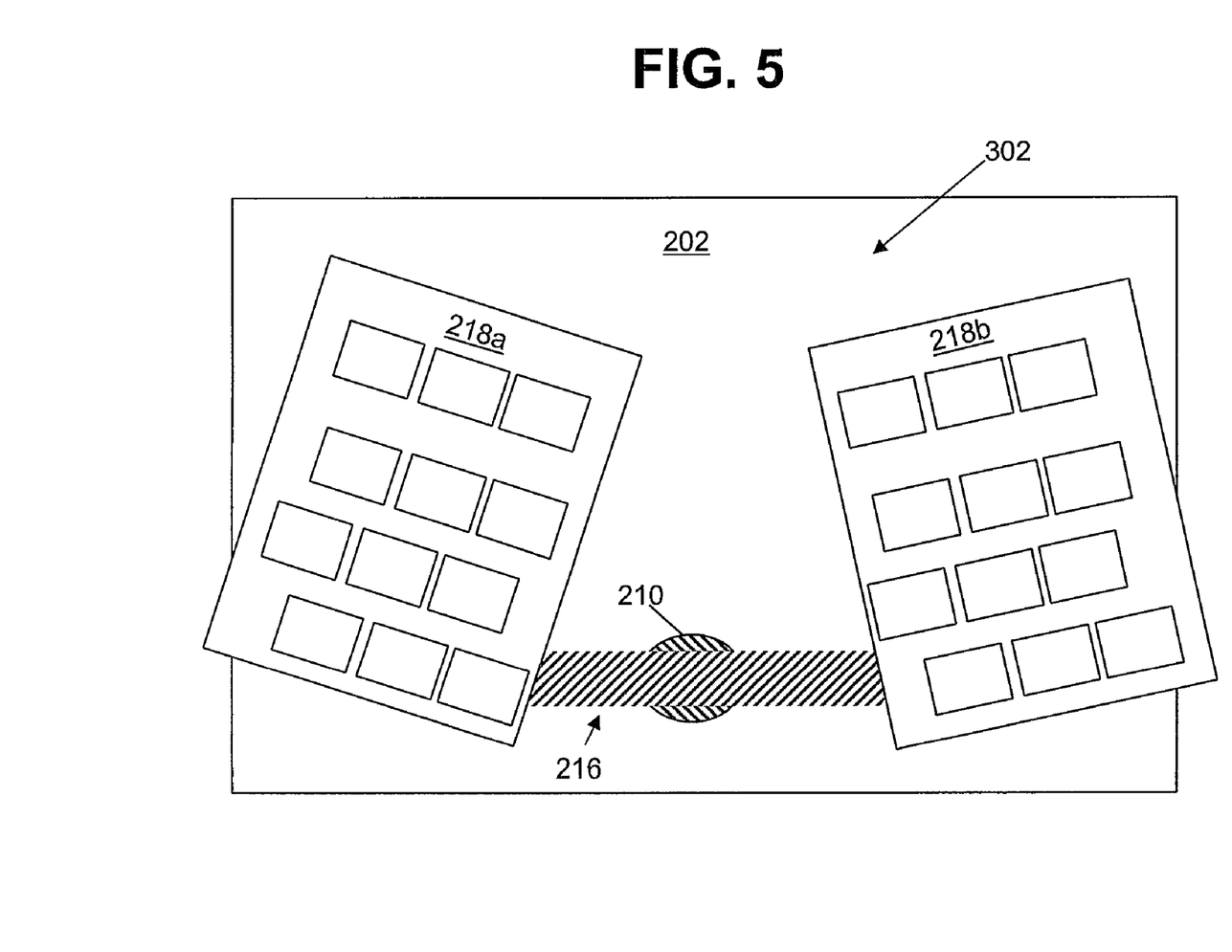
FIG. 5 depicts the split keyboard in a splayed orientation.

However, as shown in FIG. 5, the two halves of the split keyboard 302 can be splayed apart when the keyboard worm gear 216 is turned by the drive gear 210. The splaying apart of split keyboard 302 is also under the control of EAS 148 and the electromechanical controllers 126, shown in FIG. 1, using readings from the optic sensor 152 shown in FIG. 2.

Figure 6:
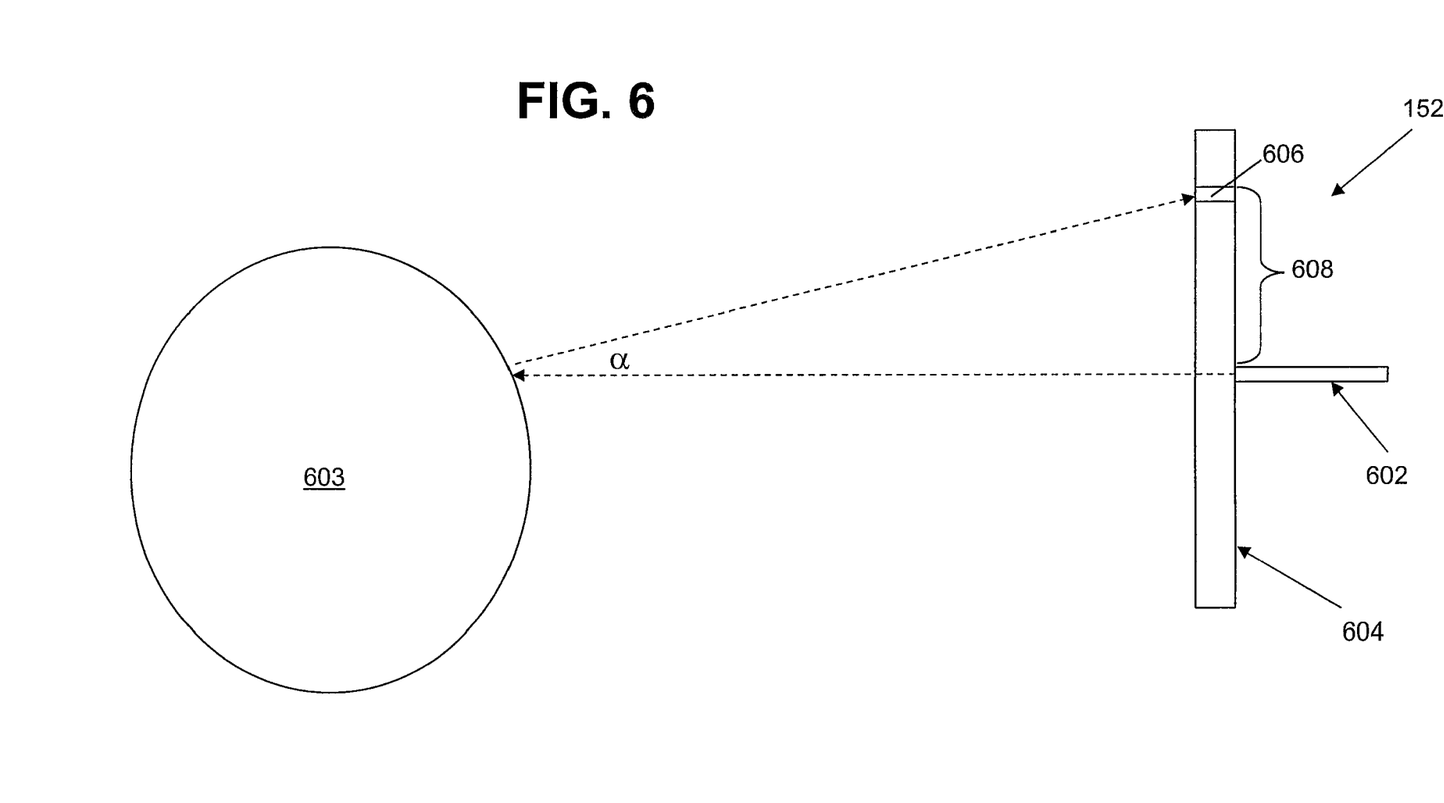
FIGS. 6-7 illustrate a positioning sensor reflecting light off user's eyeball.
Figure 7:
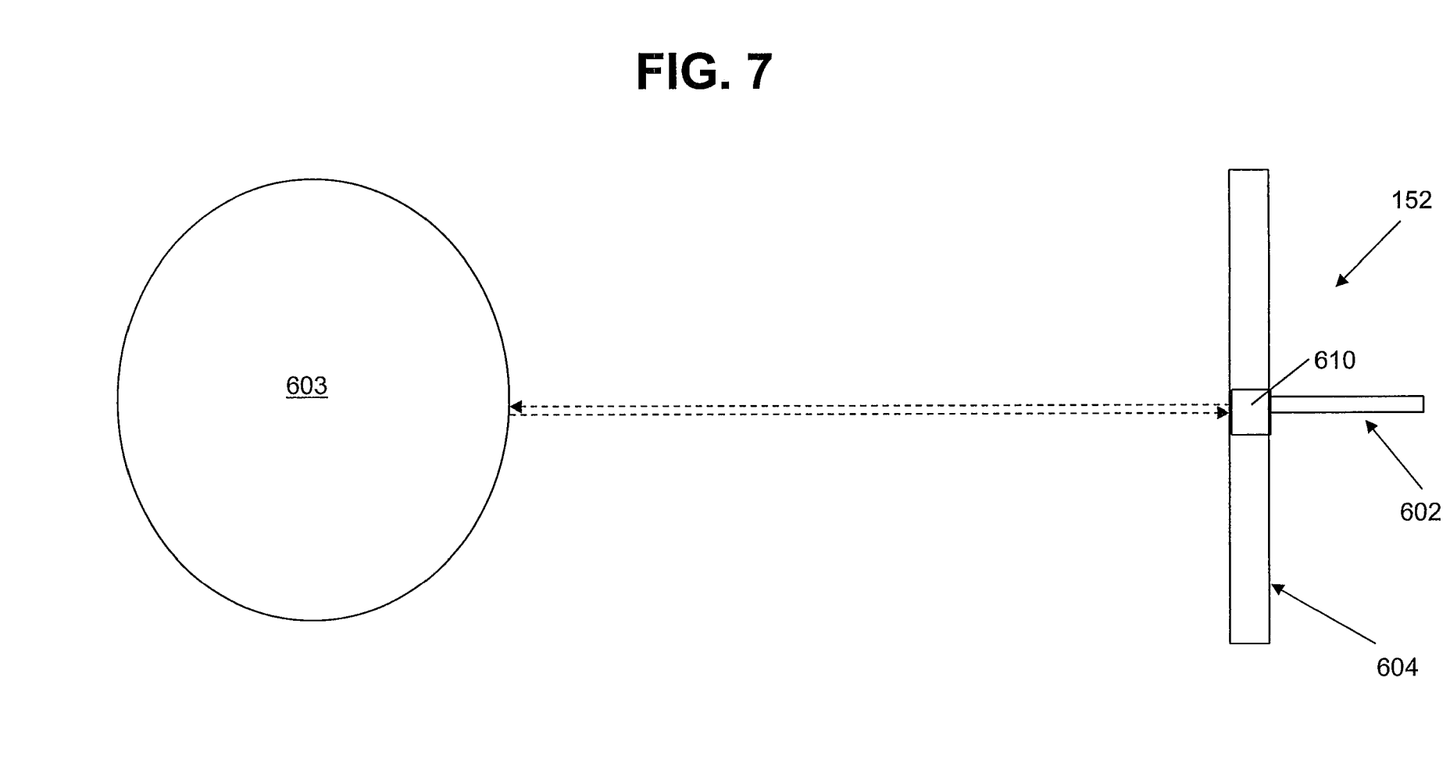

As stated above, optic sensor 152, which includes a light emitter and a light sensor, is able to make two measurements. The first measurement is the distance from a computer monitor to a user's eyes. The second measurement makes a determination of whether the user's eyes are above or below the top of the computer monitor. Referring now to FIG. 6, assume that the user does not wear glasses. A light emitter 602 sends a beam of (preferably coherent and visible) light to a user's eye 603. The light reflects back from the user's eye 603 to a light sensor 604, which either is translucent or has a center hole (not shown), and thus is able to pass the light being emitted by the light emitter 602. By measuring the amount of time that it takes the coherent light beam to return to the light sensor 604, the distance from the user's eye 603 to the optic sensor 152 can be calculated using software logic found in EAS 148 (shown in FIG. 1). Due to the natural curvature of the user's eye 603, and because the user's eye 603 is below the light emitter 602 in FIG. 6, the coherent light reflects back to a sector 606 of the light sensor 604. The distance 608 from the light emitter 602 to the sector 606, along with the time that it takes the light to reach and return from the user's eye, can be used to calculate angle α. This angle can be then used as an input to EAS 148 to automatically adjust the height of the monitor and keyboard in a manner described above. In one embodiment, however, the height of the monitor and/or keyboard is simply moved up until the reflected light strikes sector 610, as shown in FIG. 7. When the reflected light strikes sector 610, then the monitor is properly positioned such the top of the monitor is level with the user's eyes.

Because the user's eye 603 is the most reflective part of the user's face, the light emitter 602 can be randomly moved up and down until the light sensor 604 detects the emitted light from the user's eye 603. As soon as the light sensor 604 detects the emitted light, the position of the monitor can be "fine tuned" to align the top of the monitor with the user's eyes by moving the optic sensor 152 (by moving the monitor housing 220 or the base enclosure 202 shown in FIG. 2) until the reflected light hits the sector 610.

Figure 8:
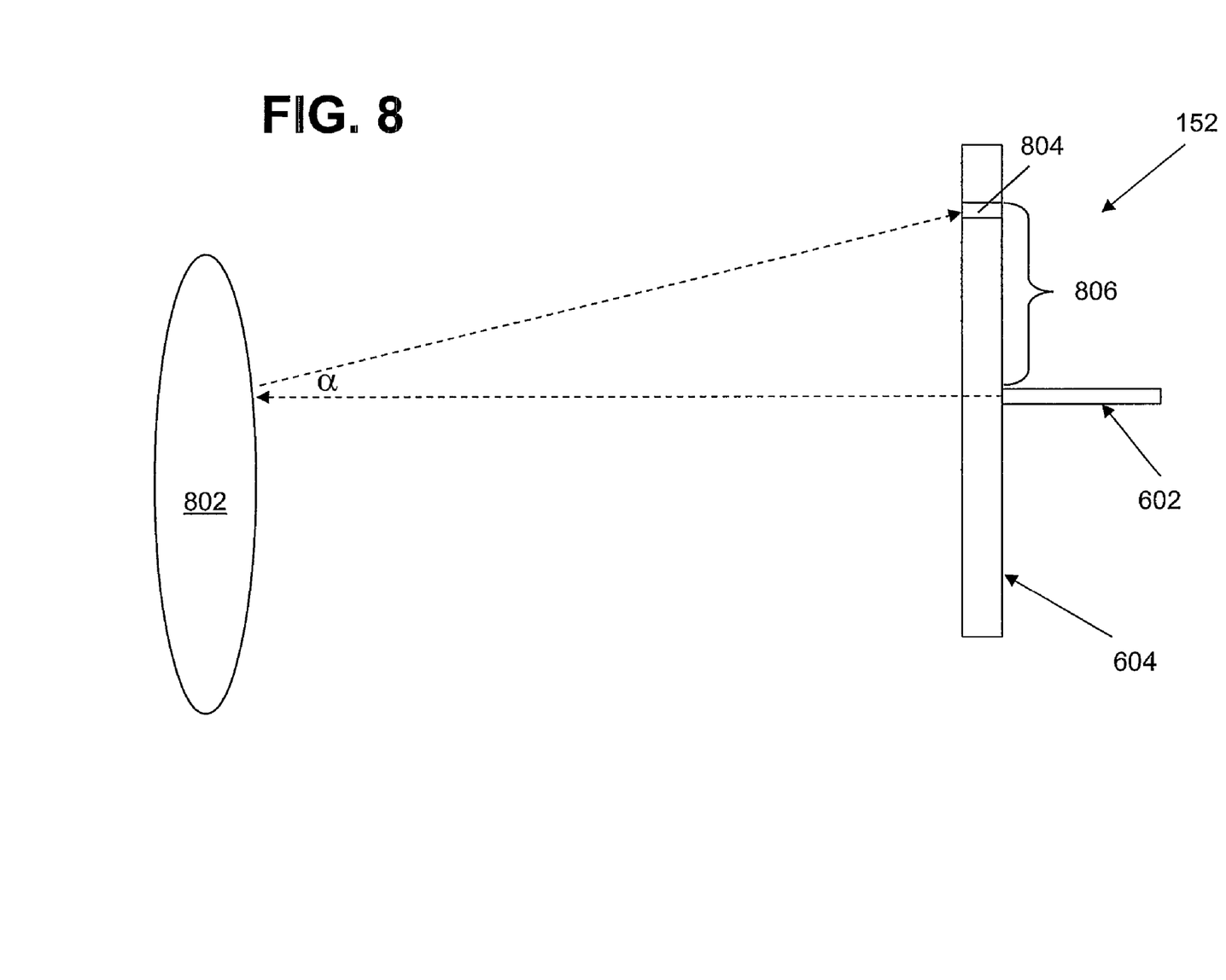
FIGS. 8-9 illustrate a positioning sensor reflecting light off user's spectacles.
Figure 9:
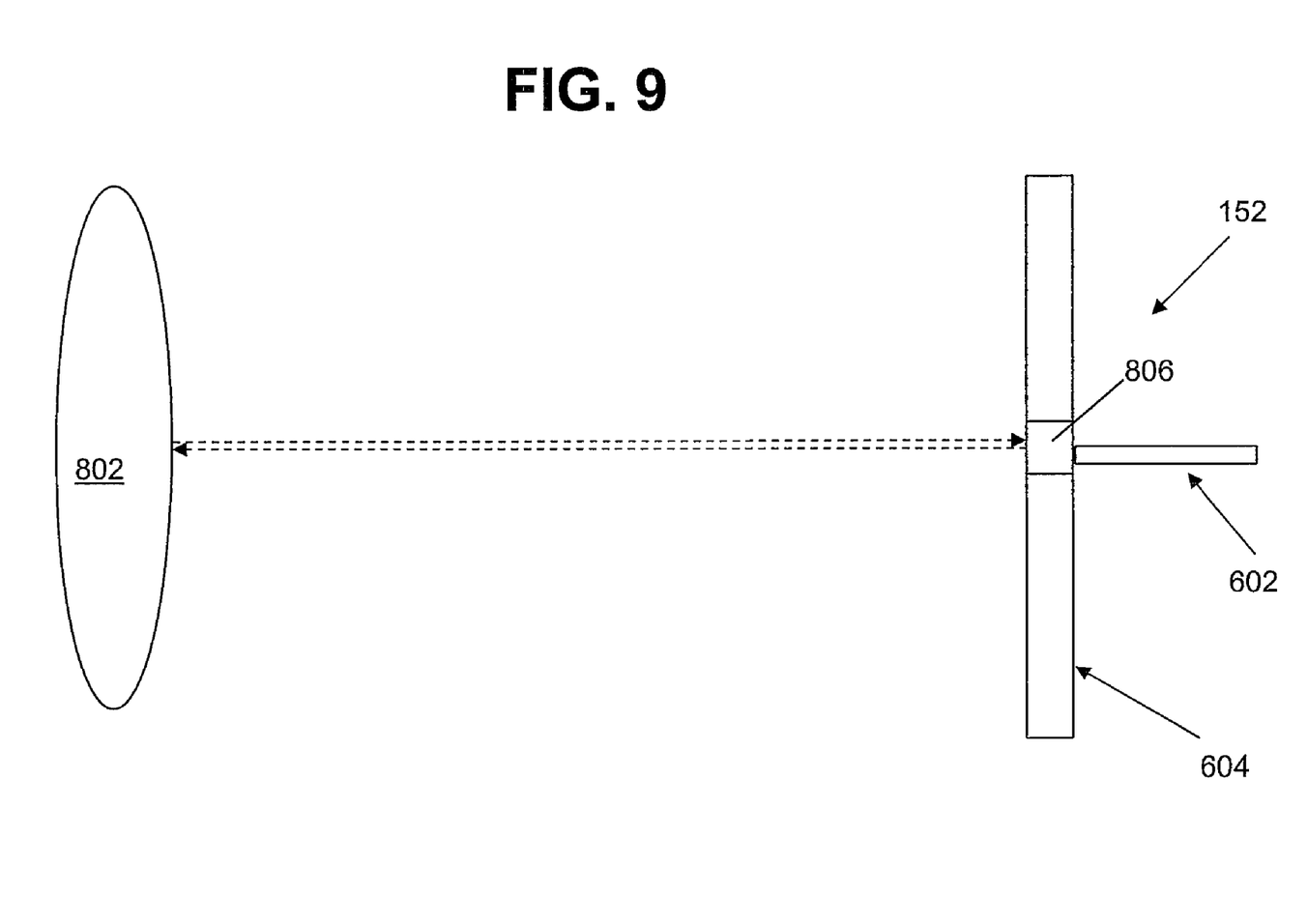

If the user is wearing spectacles (glasses), the process works in a similar manner. That is, as shown in FIG. 8, the coherent light is emitted from the light emitter 602 to strike a spectacle lens 802 (which, like the user's eye, has a natural front curvature), and is reflected back to a sector 804 to measure the angle and distance from the user's eyes to the top of the monitor. Again, either the angle α can be calculated according to adjust the position 806 of the sensor 152 (and thus the base and/or monitor), or the base/monitor can be moved until the light is reflected back to a sector 806 (shown in FIG. 9), thus ensuring that the user's eyes are vertically aligned with the top of the monitor.

As described above, the optic sensor 152 is able to measure the distance from the user's eyes to the monitor. This is particularly useful when splaying apart the split keyboard 302, as shown in FIG. 5. That is, if the user is close to the computer, then the splay angle will be greater than if the user is far from the computer in order to be ergonomically correct.

Figure 10:
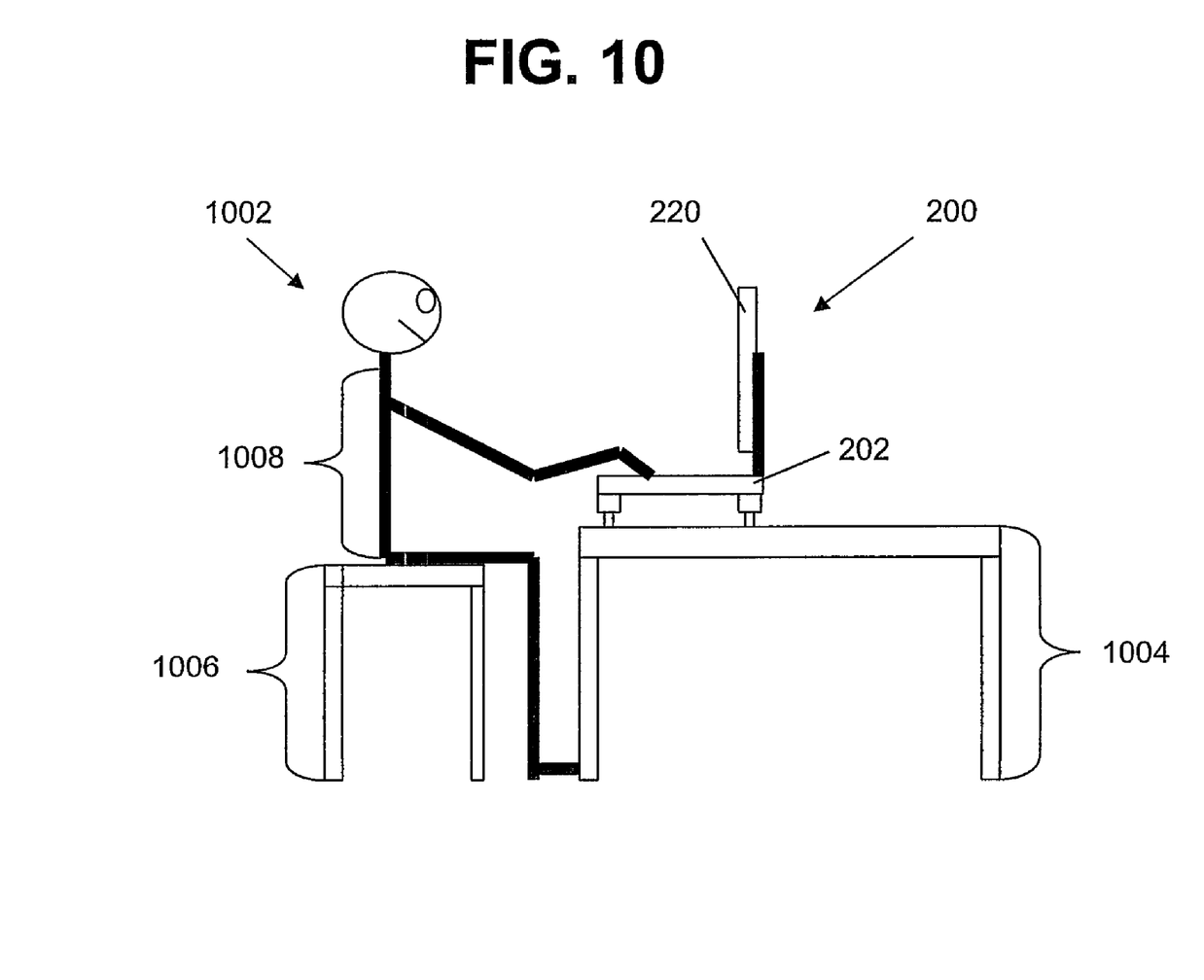
FIG. 10 depicts a user aligned in an ergonomically correct orientation with respect to the laptop computer.

Referring now to FIG. 10, a user 1002 is shown using the computer 200 that has been automatically adjusted to be ergonomically correct (eyes level with the top of the monitor; arms in a neutral position) for that user. Note that the table height 1004 and the chair height 1006 are irrelevant, since the automatic mechanisms described above will position the computer 200 in a proper orientation. However, the torso length 1008 of the user 200 is significant, since this will affect how the monitor, base and keyboard are adjusted. That is, if the user has a long torso, then the height of the base housing 202 and monitor housing 220 will be different than if the user has a short torso. Assume that the user 1002 has a long torso length 1008. When the top of the monitor housing 220 is horizontal to the user's eyes (using one or more of the processes described above), the base enclosure 202 (and thus the keyboard) are adjusted lower such that the user's arms are in a neutral position. However, if the user 1002 has a short torso length 1008, then the base enclosure 202 will positioned higher, since the user's arms will likely be shorter. Similarly, if the user has a long torso length 1008 (and presumably longer arms), the splay degree of the split keyboard will be different than if the user has a short torso length 1008.

Figure 11:
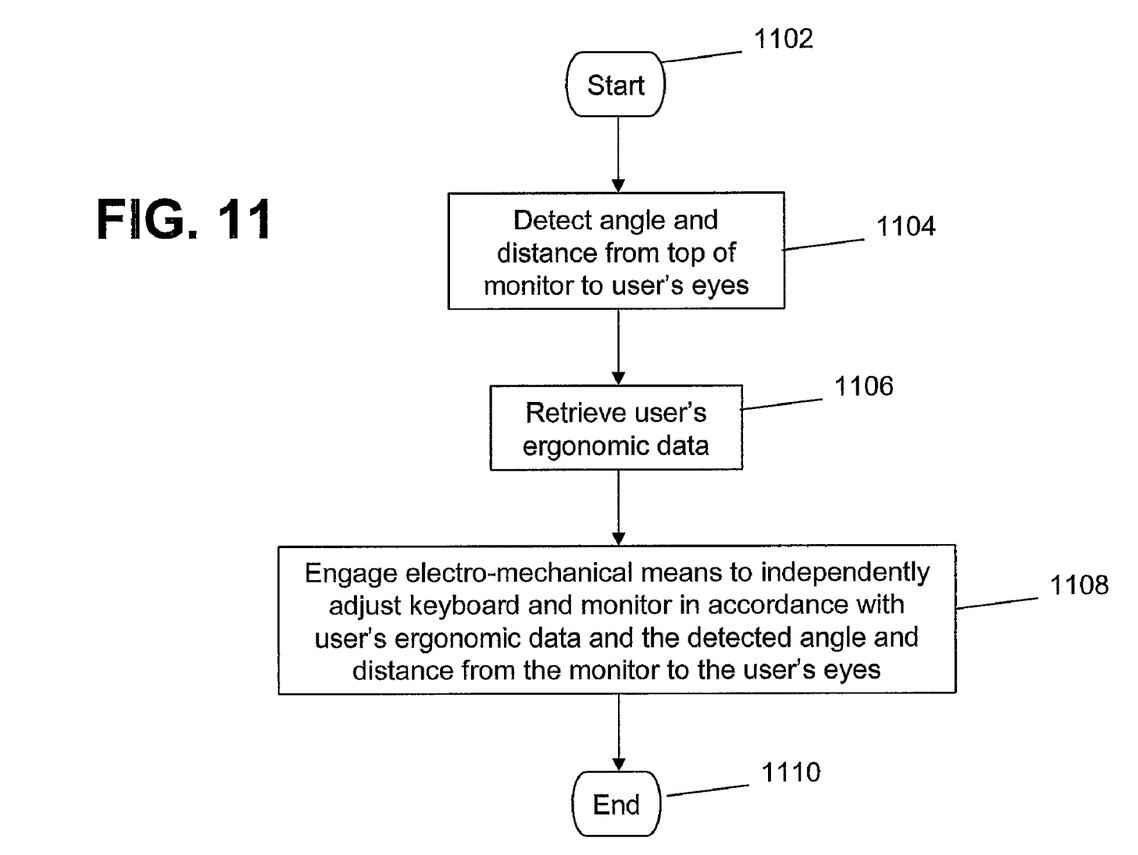
FIG. 11 is a high-level flow-chart of exemplary steps taken by the present invention to automatically orient the laptop computer with the user through the use of the positioning sensor.

Referring now to FIG. 11, a high-level flow chart of steps taken to automatically adjust a computer for a particular user is presented. After initiator block 1102, which may be prompted by a user turning on or logging onto a computer, the distance and angle from the optic sensor (at the top of the monitor) to the user's eyes are measured (block 1104) using the optic sensor 152 described above. The particular user's ergonomic data, including but not limited to her torso length and her preference for a split or traditional linear keyboard, is retrieved (block 1106). This data, along with the detected distance and angle from the optic sensor to the user's eyes, is used to automatically position the monitor and keyboard in a manner described above (block 1108). Note that the positioning of the keyboard is performed by calculating the position of the user's eyes and arms/wrists in a manner described above, while the positioning of the monitor may be performed using the "trial and error" fuzzy logic described above (in which the monitor is simply moved until the light reflects back to the central portion of the light sensor). The process ends at terminator block 1110.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of adjusting a computer to an ergonomically correct orientation for a specific user, the method comprising:
    detecting an angle and a distance from an optic sensor to a user's eye, wherein the optic sensor is mounted to a top of a monitor;
    automatically adjusting an elevation of a base of the computer by vertically moving the base of the computer until the optic sensor is horizontally aligned with the user's eye, wherein the base enclosure maintains a substantially horizontal orientation.

* * * * *